3,156,719
PROCESS FOR PREPARING DIALKYL 2,5-DIARYL-
AMINO-3,6-DIHYDROTEREPHTHALATES
Paul H. Griswold, Jr., Wilmington, Del., and William S. Struve, Chatham, N.J., assignors to E. I. du Pont de Nemours and Company, Wilmington, Del., a corporation of Delaware
No Drawing. Filed Mar. 1, 1962, Ser. No. 176,819
8 Claims. (Cl. 260—471)

This invention relates to an improvement in the process for the preparation of dialkyl 2,5-diarylamino-3,6-dihydroterephthalates by the condensation of arylamines with succinylsuccinic esters. More particularly, it relates to the use of new catalysts in such a process.

The condensation of an arylamine with a dialkyl succinylsuccinate to form a dialkyl 2,5-diarylamino-3,6-dihydroterephthalate is illustrated by the following equation:

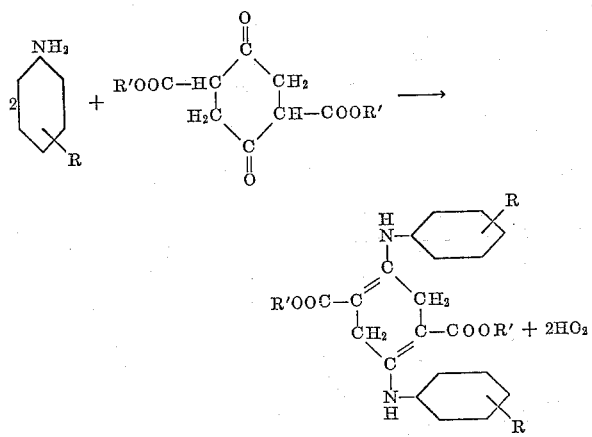

where R may be hydrogen, halogen, alkyl, alkoxy, or a fused benzene ring, and R' is an alkyl group containing from 1–4 carbon atoms.

The above reaction is well known. It was described by Liebermann as early as 1914 in Ann. 404, 272. A more recent publication is U.S. Patent 2,821,541 to Struve. Struve discloses the condensation of a dialkyl succinylsuccinate with aniline or substituted anilines in the presence of an inert, high-boiling diluent, such as a mixture of biphenyl and diphenyl oxide and catalyst chosen from the salts of aniline which are soluble in the reaction mixture. Aniline hydrochloride is a preferred catalyst, but the hydrobromide, the hydroiodide, the acetate, and the nitrate are also disclosed. Struve further discloses that to insure solubility of the catalyst, a large excess of aniline (2 to 10 times theory) is used. The process of U.S. Patent 2,821,541 has proved to be a highly practical procedure, and it can be employed as an intermediate step in the manufacture of the commercial pigments known as quinacridone pigments. In view of the highly practical nature of this process, it is desirable to have alternative catalysts which could be used in place of the aniline salts disclosed in U.S. Patent 2,821,541. It is also desirable to have catalysts which have advantages over the catalysts of the prior art, especially in terms of solubility in the reaction mixture. It is, therefore, an object of the present invention to provide new and improved catalysts for use in the production of dialkyl 2,5-diarylamino-3,6-dihydroterephthalate.

It has now been found that certain sulfonic acids may be used to marked advantage as catalysts in the production of dialkyl 2,5-diarylamino-3,6-dihydroterephthalates by the condensation of arylamines with succinylsuccinic esters.

The process of this invention comprises condensing in an inert, high-boiling diluent and in the presence of a sulfonic acid catalyst one mol of a dialkyl succinylsuccinate with 2 mols of an arylamine having the following formula:

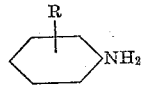

where R is from the group consisting of hydrogen, halogen, alkyl, alkoxy, or a fused benzene ring. The reaction conditions of U.S. Patent 2,821,541 are applicable to this reaction, except that the new catalysts of this invention are used. Of course, the sulfonic acid added reacts in situ with a part of the arylamine, wherefore the actual catalyst is a salt of the arylamine, corresponding, except for the acid moiety, to the aniline hydrochloride employed in said patent.

In a preferred embodiment of this invention, 1 mol of diethyl succinylsuccinate is suspended in about 3 to 10 times its weight of a eutectic mixture of 23.5% biphenyl and 76.5% diphenyloxide, known commercially as "Dowtherm A." There is then added about 4 mols of aniline and about 0.03 mols of paratoluenesulfonic acid. The charge is blanketed with an inert gas such as nitrogen; then a vacuum is applied, and the charge is heated under vacuum for about 2 hours at 105° C.–110° C. The acid catalyst is then neutralized with a small amount of sodium carbonate in an aqueous solution, the water and excess aniline removed by vacuum distillations, and the mixture cooled, whereupon the resulting dialkyl 2,5-dianilino-3,5-dihydroterephthalate precipitates and may be isolated by filtration from the "Dowtherm A."

In a further aspect of this invention, the dialkyl dianilinodihydroterephthalate is not isolated from the "Dowtherm A," but instead the reaction mixture is heated further to the boiling point of the "Dowtherm A" whereupon cyclization of the dialkyl dianilinodihydroterephthalate occurs with the direct formation of 6,13-dihydroquinacridone. The advantages of this invention are especially apparent in the yield and quality of the dihydroquinacridone resulting from this preferred cyclization step. The cyclization may also be accomplished, often with improved yields, by adding the solution of the dianilinodihydro ester in "Dowtherm A" slowly to several volumes of boiling "Dowtherm A."

For a clearer understanding of the invention, the following specific examples are given. These examples are intended to be merely illustrative of the invention and not in limitation thereof. Unless otherwise specified, all parts are by weight.

*Example I*

256 parts (1 mol) of diethyl succinylsuccinate is dissolved in 850 parts of "Dowtherm A" (a eutectic mixture of 23.5% by weight of biphenyl and 76.5% diphenyloxide) at about 70° C. The solution is charged to a suitable vessel equipped with an efficient agitator; a condensing system for reflux and for product removal; a means of heating externally; a means for introducing an inert atmosphere; and a means for applying a vacuum through the condensing system. The system is purged with an inert gas, preferably dry nitrogen, and 414 parts (4.45 mols) of aniline is introduced together with 6.6 parts (0.038 mol) of paratoluenesulfonic acid. Vacuum is then applied to the vessel and the charge is heated to 105° C.–110° C. The vacuum is maintained at about 35 mm. mercury absolute pressure while heating is continued for about 2 hours. At the end of the heating period, the charge is cooled to 55° C.–60° C. and the vacuum is relieved with nitrogen gas. 4.2 parts of sodium carbonate ($Na_2CO_3$) dissolved in 33 parts of water is then added to the charge which is stirred vigorously for 10 minutes to neutralize the residual catalyst. Vacuum is then again applied and the charge heated at about 60° C. until all water is removed. It is then heated to about 140° C. at a pressure of about 25 mm. mercury, whereupon the excess aniline is removed by distillation. After relieving the vacuum with nitrogen, the charge is cooled while stirring in the presence of nitrogen to give a slurry of about 375 parts of diethyl 2,5-dianilino-3,6-dihydroterephthalate in "Dowtherm A" (92% yield based on diethyl succinylsuccinate used). This material is then isolated by filtering, washing free of "Dowtherm A" with alcohol and then removing alcohol in a dryer to give a slightly reddish powder which is stable as long as it is kept substantially free of water. A principal use of this powder is in the conversion to dihydroquinacridone which may conveniently be done without isolation as shown in Example II.

*Example II*

The product of Example I is readily converted to 6,13-dihydroquinacridone without isolation as follows. When the distillation of excess aniline is complete, the vacuum is relieved with nitrogen gas and about 500 parts of "Dowtherm A" is added to replace that lost during the removal of the aniline. The resulting solution, after clarifying by hot filtration if necessary, is added at a steady rate over 1.5 hours to 1350 parts of boiling "Dowtherm A." The charge is then held at reflux for 20 minutes, cooled to about 50° C. under nitrogen atmosphere, filtered, washed free of "Dowthern A" with methanol and dried to give 288 parts (91.9% based on diethyl succinylsuccinate) of dihydroquinacridone, a pale pinkish powder which is readily oxidized in known manner (see U.S. 2,821,529) to quinacridone of high quality, a valuable pigment in the red-to-violet range.

*Example III*

This example shows a comparison of the use of aniline hydrochloride as the catalyst vs. the use of p-toluenesulfonic acid as these agents affect the yield and quality of the dihydroquinacridone, which is ultimately prepared.

In a series of runs based on the process of Example II using 1 mol of succinylsuccinic ester, the amount of aniline used is varied as shown in the following table. This table also shows the yields and an appraisal of quality of the dihydroquinacridone obtained.

| | SSE, 1mol= 256 pts., mols | Aniline, 1mol= 93 pts., mols | Aniline-hydro-chloride 0.036 mol= 4.6 pts. Percent Yield | DQA Quality | p-Toluene-Sulfonic Acid, 0.038 mol= 6.5 pts. Percent Yield | DQA Quality |
|---|---|---|---|---|---|---|
| A | 1 | 2.2 | | | 85.3 | Poor. |
| B | 1 | 3.3 | 84.7 | Poor | 91.1 | Excellent. |
| C | 1 | 4.4 | 90.4 | Fair | 91.7 | Do. |
| D | 1 | 6.7 | 91.9 | Excellent | | Do. |
| E | 1 | 8.7 | 92.0 | do | 92.4 | Do. |

The above results clearly show that when p-toluenesulfonic acid is the catalyst, as little as 3.3 mols of aniline will achieve substantially the same results as 6.7 mols of aniline when aniline hydrochloride is the catalyst.

*Example IV*

86.8 parts (0.36 mol) of succinylsuccinic ester (mixed methyl ethyl ester) is dissolved in 325 parts "Dowtherm A" in a suitable vessel as described in Example I. 315 parts (2.47 mols) of o-chloroaniline is added to the solution along with 0.21 part p-toluenesulfonic acid. The vessel is evacuated to about 35 mm. Hg, heated to 110° C.–112° C. and held at that temperature for 2 hours. It is then cooled to 60° C.–65° C. and the vacuum relieved with nitrogen gas. A solution of 0.4 part sodium carbonate in 50 parts water is added and the charge stirred for 10 minutes to neutralize the acid catalyst. Vacuum is again applied at about 15 mm. Hg and the water removed at 60° C.–65° C. after which the temperature is increased until distillation of the excess o-chloroaniline begins along with some "Dowtherm A." Periodically during the distillation, fresh "Dowtherm A" is added in approximately the volume of distillate removed and distillation continued until the distillate is substantially free of o-chloroaniline. Keeping the solution at 130° C.–140° C. and blanketed with nitrogen, it is filtered and then added slowly over a period of about 1 hour to 480 parts of boiling "Dowtherm A." The charge is held at reflux for 20 minutes, cooled to about 50° C. under nitrogen, filtered, washed free of "Dowtherm A" with methanol and dried to give 123 parts of 4,11-dichloro-6,13-dihydroquinacridone (89.5% yield) of good quality.

*Example V*

52.4 parts (0.127 mol) of succinylsuccinic ester (mixed methyl ethyl ester) is dissolved in 325 parts "Dowtherm A" in a suitable vessel. 294 parts (2.3 mols) of p-chloroaniline is added to the solution along with 2.1 parts of p-toluenesulfonic acid. The procedure described above in Example IV is then followed throughout except for the use of 2.7 parts Na$_2$CO$_3$ to neutralize the acid. After pyrolysis in boiling "Dowtherm A" and isolation of the product, 66 parts (79.4% yield) of 2,9-dichloro-6,13-dihydroquinacridone is obtained.

*Example VI*

Following the general procedure of Example IV:

| | Parts |
|---|---|
| Methyl ethyl succinylsuccinate (0.36 mol) | 86.8 |
| "Dowtherm A" | 325 |
| p-Toluidine (2.52 mols) | 269 |
| p-Toluenesulfonic acid | 2.1 | are reacted and then neutralized with 2.7 parts Na$_2$CO$_3$ in 20 parts water.

After removal of excess p-toluidine by vacuum distillation, pyrolysis is effected by adding the solution to boiling "Dowtherm A." The product is then isolated, and 98.0 parts of 2,9-dimethyl-6,13-dihydroquinacridone is obtained (80% yield).

310 parts p-anisidine may replace the p-toluidine in this example to obtained, after cyclization, 2,9-dimethoxy-6,13-dihydroquinacridone.

*Example VII*

This example differs from Example V only in the use of 265 parts (2.37 mols) of p-fluoroaniline in place of the p-chloroaniline to give as the final product 60.6 parts (79.9% yield) of 2,9-difluoro-6,13-dihydroquinacridone. In a similar run using 181 parts (1.63 mols) of p-fluoroaniline, the yield is 57 parts (75.6% yield) of equivalent product.

*Example VIII*

(a) Following the procedure outlined in Example I, 2.4 parts of p-toluenesulfonic acid is used in place of 6.6 parts. Then, in the neutralization step, only 2.0 parts of sodium carbonate is required instead of 4.2 parts. It is found that these changes do not adversely affect the yield or quality of the resulting diethyl dianilinodihydroterephthalate. Moreover, the 6,13 dihydroquinacridone resulting from cyclization in boiling "Dowtherm A" as shown in Example II is obtained in equivalent yield and quality.

(b) Following the procedure outlined in Example I, the time of reaction of aniline with succinylsuccinic ester in the presence of p-toluenesulfonic acid is reduced from 2 hours to 30 minutes without adversely affecting yield and quality, especially as judged in terms of the 6,13-dihydroquinacridone produced when the terephthalate product is subjected to the cyclization reaction of Example II.

(c) Finally, it is found that the combination of reduced p-toluenesulfonic acid as catalyst in part (a) and of reduced reaction time in part (b) may be used without adverse effect on yield or quality of the resulting products.

*Example IX*

Using the procedure outlined in Example I, the following catalysts may be used in place of 6.6 parts of p-toluene sulfonic acid:

| | Parts |
|---|---|
| o-Toluenesulfonic acid | 6.6 |
| Benzenesulfonic acid | 6.0 |
| Xylenesulfonic acid | 7.2 |
| Naphthalenesulfonic acid | 8.0 |
| Ethanesulfonic acid | 4.0 | to give substantially equivalent yields and quality.

The sulfonic acid catalysts of this invention may be represented by the following formula $$RSO_3H$$

where R is lower alkyl, phenyl, or a naphthyl radical or a substituted derivative of phenyl or naphthyl radicals wherein there are 1 to 2 substituents from the group consisting of lower alkyl, lower alkoxy, and halo radicals. Examples of sulfonic acids which can be used include ethanesulfonic acid, propanesulfonic acid, butanesulfonic acid, o-chlorobenzenesulfonic acid, p-bromobenzenesulfonic acid, o-fluorobenzenesulfonic acid, 2-naphthalenesulfonic acid, benzenesulfonic acid, p-toluenesulfonic acid, xylenesulfonic acid, and the like. p-Toluenesulfonic acid is a preferred catalyst.

The amount of catalyst used varies from a maximum of about 0.05 mol per mol of succinylsuccinic ester to a minimum of about 0.003 mol per mol of succinylsuccinic ester. Preferred amounts are in the range of about 0.01 to about 0.04 mol per mol of ester. In the lower ranges, yields tend to drop along with quality so that a practical minimum of about 0.003 mol is suggested. Usage in excess of about 0.05 mol appears to offer no practical advantage, but amounts in excess of this upper limit can be used.

The potential application of this invention to the condensation of arylamines with dialkyl succinylsuccinates is quite comprehensive. The examples have shown a variety of substituted anilines, the only restriction being that the substituent group be relatively inactive and that there be a free position ortho to the amino group. The naphthylamino and various substituted derivatives also lend themselves to the reaction. Preferred arylamines include aniline, o-chloroaniline, p-chloroaniline, o-toluidine, p-toluidine, m-toluidine, p-anisidine, p-fluoroaniline, p-bromoaniline, p-iodoaniline, p-butylaniline, and p-butoxyaniline.

The alkyl groups in the dialkyl succinylsuccinate can be derived from any lower alkyl group containing up to 4 carbon atoms, such as methyl, ethyl, propyl, isopropyl, n-butyl, or isobutyl. It is not essential that the two alkyl groups be alike.

The inert, high-boiling liquid in which the reaction is carried out is preferably the eutectic mixture of 23.5% biphenyl and 76.5% diphenyloxide commonly available in the trade as "Dowtherm A." However, many other inert high-boiling liquids are useful within a boiling range of about 225° C.–300° C. These useful liquids include the methylnaphthalenes, biphenyl, diphenyloxide, diethylphthalate, tetramethylene sulfone, and various mineral oils boiling within the range set forth. The amount of inert liquid medium used is not at all critical. However, it is desirable for reasons of economy to keep the amount of this liquid on the low side. Larger amounts will do no harm to the reaction, but will make its subsequent removal increasingly difficult. A preferred amount of the liquid medium is from about 4 to 10 times the weight of the dialkyl succinate which is to be reacted.

Since it is obvious that many changes and modifications can be made in the above-described details without departing from the nature and spirit of the invention, it is to be understood that the invention is not to be limited to said details except as set forth in the appended claims.

We claim as our invention:

1. In a process for preparing a dialkyl 2,5-diarylamino-3,6-dihydroterephthalate by condensing an arylamine with a dialkyl succinylsuccinate in an inert liquid reaction medium, said arylamine being a member of the group consisting of phenyl- and naphthylamines which have a free position ortho to the amino group and which bear in the remaining positions substituents selected from the group consisting of hydrogen, halogen, lower alkyl and lower alkoxy, and said liquid reaction medium being a member selected from the group consisting of
    biphenyl-diphenyloxide eutectic melt,
    the methyl napthalenes,
    biphenyl,
    diphenyloxide,
    diethylphthalate,
    tetramethylene sulfone, and
    mineral oils boiling within the range of 225° to 300° C., the improvement which comprises effecting said condensation by the aid of a catalytic quantity of a salt, formed in situ, from a portion of said arylamine and a sulfonic acid of the formula R—SO₃H, wherein R is a member of the group consisting of
    (a) lower alkyl, phenyl and naphthyl, and
    (b) phenyl and naphthyl nuclei containing no more than two substituents and wherein said substituents are selected from the group consisting of halogen, lower alkyl and lower alkoxy.

2. A process for preparing a dialkyl 2,5-diarylamino-3,6-dihydroterephthalate, which comprises condensing an arylamine with a dialkyl succinylsuccinate in a eutectic melt of biphenyl and diphenyloxide, said arylamine being a member of the group consisting of phenyl- and naphthylamines which have a free position ortho to the amino group and which bear in the remaining positions substituents selected from the group consisting of hydrogen, halogen, lower alkyl and lower alkoxy, and said melt containing as catalyst the salt, formed in situ, from a part of said arylamine and a catalytic quantity of p-toluene sulfonic acid.

3. A process for preparing a dialkyl 2,5-dianilino-3,6-dihydroterephthalate, which comprises condensing aniline with a dialkyl succinylsuccinate in a eutectic melt of biphenyl and diphenyl oxide, in the presence of a catalytic quantity of the salt of aniline and p-toluenesulfonic acid.

4. A process for preparing a dialkyl 2,5-di-o-chloroanilo-3,6-dihydroterephthalate, which comprises condensing o-chloroaniline with a dialkyl succinylsuccinate in a eutectic melt of biphenyl and diphenyloxide, in the presence of a catalytic quantity of the salt of o-chloroaniline and p-toluenesulfonic acid.

5. A process for preparing a dialkyl 2,5-di-p-toluidino-3,6-dihydroterephthalate, which comprises condensing p-toluidine with a dialkyl succinylsuccinate in a eutectic melt of biphenyl and diphenyloxide, in the presence of a catalytic quantity of the salt of p-toluidine and p-toluenesulfonic acid.

6. A process for preparing a dialkyl 2,5-di-p-anisidino-3,6-dihydroterephthalate, which comprises condensing p-anisidine with a dialkyl succinylsuccinate in a eutectic melt of biphenyl and diphenyloxide, in the presence of a catalytic quantity of the salt of p-anisidine and p-toluenesulfonic acid.

7. A process for preparing a dialkyl 2,5-di-p-chloroanilino-3,6-dihydroterephthalate, which comprises condensing p-chloroaniline with a dialkyl succinylsuccinate in a eutectic melt of biphenyl and diphenyloxide, in the presence of a catalytic quantity of the salt of p-chloroaniline and p-toluenesulfonic acid.

8. In a process for preparing a dialkyl 2,5-diarylamino-3,6-dihydroterephthalate by condensing an arylamine with a dialkyl succinylsuccinate in a eutectic melt of biphenyl and diphenyloxide, said arylamine being a member of the group consisting of phenyl- and naphthylamines which have a free position ortho to the amino group and which bear in the remaining positions substituents selected from the group consisting of hydrogen, halogen, lower alkyl and lower alkoxy, the improvement which comprises effecting said condensation by the aid of a catalytic quantity of a salt, formed in situ, from a portion of said arylamine and a sulfonic acid of the formula $R-SO_3H$, wherein R is a member of the group consisting of (a) lower alkyl, phenyl and naphthyl, and (b) phenyl and naphthyl nuclei containing no more than two substituents and wherein said substituents are selected from the group consisting of halogen, lower alkyl and lower alkoxy.

References Cited in the file of this patent

UNITED STATES PATENTS 3,045,040　Deuschel _____ July 17, 1962

FOREIGN PATENTS 1,082,907　Germany _____ June 9, 1960